United States Patent [19]

Takamura et al.

[11] Patent Number: 4,875,203

[45] Date of Patent: Oct. 17, 1989

[54] TRACKING SERVO SIGNAL GENERATING DEVICE FOR AN OPTICAL DISC

[75] Inventors: Yoshinari Takamura, Osaka; Kazuaki Obara, Kadoma; Michiyoshi Nagashima, Hirakata, all of Japan

[73] Assignee: Matsushita Electric Industrial Co., Ltd., Osaka, Japan

[21] Appl. No.: 2,952

[22] Filed: Jan. 13, 1987

[30] Foreign Application Priority Data

Jan. 16, 1986 [JP] Japan ..................... 61-6704

[51] Int. Cl.$^4$ ............................................. G11B 7/00
[52] U.S. Cl. ......................................... 369/46; 369/44
[58] Field of Search ........................ 369/43, 44, 46, 45

[56] References Cited

U.S. PATENT DOCUMENTS

| | | | |
|---|---|---|---|
| 4,506,149 | 3/1985 | Utsumi | 369/46 X |
| 4,544,838 | 10/1985 | Musha et al. | 369/46 X |
| 4,562,565 | 12/1985 | Tamura | 369/46 X |
| 4,698,795 | 10/1987 | Yoshio | 369/44 |
| 4,774,698 | 9/1988 | Henmi et al. | 369/46 X |

FOREIGN PATENT DOCUMENTS

| | | | |
|---|---|---|---|
| 60-217536 | 10/1985 | Japan | 369/46 |
| 60-217537 | 10/1985 | Japan | 369/46 |

Primary Examiner—Aristotelis M. Psitos
Attorney, Agent, or Firm—Stevens, Davis, Miller & Mosher

[57] ABSTRACT

An optical disk reproducing apparatus of the type in which a tracking control is performed by projecting a controlling laser beam to the center of each of a plurality of V grooves formed on an optical disk and using far-field images of light beams reflected from the optical disk and the signals recorded on the adjacent slopes of the V groove are read by respectively projecting two reproducing laser beams to the slopes. To remove the low-frequency components of the signals on the slopes entering a tracking error signal, the low-frequency components are extracted from the two reproduced signals by low-pass filters and the difference therebetween is generated as a correction signal which in turn is subtracted from the tracking error signal, thereby improving the accuracy of the tracking control.

2 Claims, 4 Drawing Sheets

LASER

F I G. 4(a)
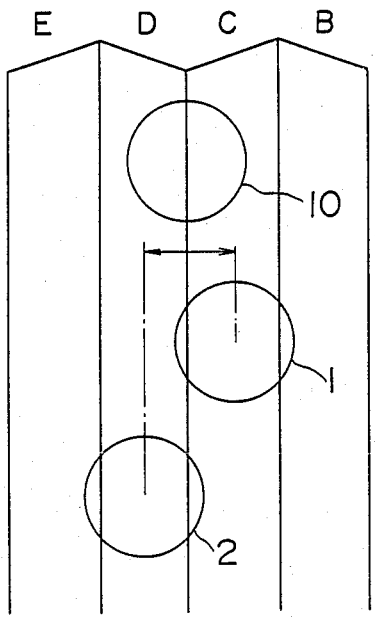
F I G. 4(b)
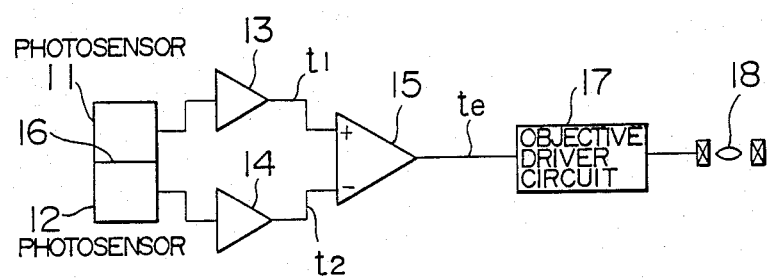

TRACKING SERVO SIGNAL GENERATING DEVICE FOR AN OPTICAL DISC

BACKGROUND OF THE INVENTION

1. FIELD OF THE INVENTION

The present invention relates to an apparatus which uses laser beams to reproduce signals recorded on optical disk, and more particularly to an optical disk reproducing apparatus of the type in which the pitch of the tracks on a optical disk is reduced to realize a high-density and high-transfer-rate recording and reproduction and which is designed to perform tracking control with greater accuracy.

2. DESCRIPTION OF THE PRIOR ART

Various optical disk apparatus of the type employing a laser light to record and reproduce various information from a disk have recently been proposed. With a view to increasing the recording density and transfer rate, we have proposed a method for recording and reproducing a signal by utilizing an oblique surface of helical or circular grooves having a V-shaped section with respect to an imaginary sectional plane a radial direction of disk (U.S. patent application Ser. No. 525,411 filed on Aug. 22, 1983).

Referring now to FIG. 2 of the accompanying drawings, there is illustrated a perspective view showing the radial section of an optical disk formed with V-grooves. In FIG. 2, numeral 41 designates the substrate of the disk having V-grooves on its surface having oblique surfaces designated by A, B, C, D ---. A recording thin film 42 such as of TeOx ($x \approx 1.1$) is formed on the surfaces of the V-grooves. As shown in FIG. 3, laser spots 1 and 2 are respectively projected to the center of the adjacent slopes, e.g., A and B or C and D in FIG. 2. By driving the laser spots independently of each other, it is possible to record independent signals on the two slopes by changing reflectivity of the small areas 3 on the track by producing reaction by the laser beam spot.

Next, the method of reproducing the signals recorded in this way will be described briefly. As in the case of FIG. 3, the laser spots 1 and 2 are respectively projected to the slopes C and D. Signals recorded on the two tracks are simultaneously reproduced, and such signals are usable, for instance, to obtain a transfer rate as high as twice of the single track optical disk system. As disclosed in the specification of the above mentioned U.S. patent application, if the V-grooves are formed into an optimum shape, crosstalk from a neighboring oblique surface is sufficiently suppressed through receiving mainly ± first-order diffraction lights among reflection lights from the disk, and each signal of the respective tracks can be individually reproduced.

The tracking method used with the above-described recording and reproducing method will now be described.

The so-called push-pull method is used for the tracking control. As shown in (a) of FIG. 4, a tracking control laser spot 10 is arranged in such a manner that the laser spot 10 is positioned at the center of the V groove when the signal recording and reproducing laser spots 1 and 2 are positioned centrally on the tracks C and D, respectively. Shown in FIG. 4(b) is a tracking control circuit used for the tracking control. In FIG. 4(b), numerals 11 and 12 designate bisplit photosensors, 13 and 14 preamplifiers, 15 a subtractor, 17 an objective driver circuit, and 18 an objective lens.

In accordance with the push-pull method, the photosensors 11 and 12 are arranged in such a manner that their dividing line 16 coincides with the center of the V-groove on the far-field images of the reflected beams of the controlling laser spot 10 from the optical disk. Where the controlling laser spot 10 is positioned at the center of the V groove as shown in FIG. 4(a), the far-field images of the reflected beams from the optical disk are symmetrical with resect to the center of the V groove and the outputs of the photosensors 11 and 12 are equal. These photosensor outputs are respectively amplified by the preamplifiers 13 and 14, thereby producing tracking detection signals $t_1$ and $t_2$. The subtractor 15 obtains the difference between the tracking detection signals $t_1$ and $t_2$ to produce a tracking error signal $t_e$. The tracking error signal $t_e$ is given by the following equation.

$$t_e = t_1 - t_2 \tag{1}$$

In the case shown in FIG. 4(a), the tracking error signal $t_e$ is zero. Then, where the position of the controlling laser spot 10 is shifted to the track C side, the intensity distributions of the far-field images of the reflected beams are unsymmetrical with respect to the center of the V groove so that as for example, the quantity of light incident to the photosensor 11 is increased. In this case, the value of the tracking error signal $t_e$ becomes positive. The tracking error signal $t_e$ is applied, for example, to the objective driver circuit 17 in the optical head section so that the objective lens 18 is actuated to move the laser spot 10 toward the track D. On the contrary, where the position of the controlling laser spot 10 is shifted toward the track D side, the value of the tracking error signal $t_e$ becomes negative and the objective driver circuit 17 actuates the objective lens 18 to move the laser spot 10 toward the track C.

By thus using the push-pull method to effect the tracking control such that the controlling laser spot 10 is always positioned at the center of the V groove, it is possible to respectively position the signal recording and reproducing laser spots 1 and 2 at the center of the respective slopes.

Recently, it has been practiced to record and reproduce digital signals representing various information from optical disks. Generally, such digital signals are modulated by using a modulation code suited to the recording and reproducing characteristics of the optical disk and the signals are recorded by changing an optical characteristic, e.g., reflectance of the recording medium. With the modulation code for digital signals, generally a low-frequency component is included in the frequency components of the signals after the modulation. For example, the modulated signal by the NRZ modulation code includes a d.c. component, too. Also, even in the case of a modulation system involving no d.c. component, e.g., the FM modulation code, a low-frequency component such as included in the frequency band of the tracking signals is involved. Thus, when reproducing the optical disk on which such digital signals have been recorded, crosstalk is caused in the tracking signals by the reproduced signals. The generation of the crosstalk component from the reproduced signals represents the fact that the average reflectances of the reproduced tracks have changed. Therefore, particularly in such cases where the tracking control is effected on the ridge of the adjacent tracks by the push-pull system as in the case of the conventional system, the magnitudes of crosstalk in the respective tracks are not the same and thus the tracking error is increased.

For instance, where the average reflectance of the track C is greater than that of the track D in FIG. 4(a), even if the controlling laser spot 10 is positioned at the center of the V groove, the reflected light from the track C is increased so that the incident light quantity to the photosensor 11 is increased as compared with the photosensor 12 and the tracking error signal $t_e$ has a positive value. This is the same with the case in which the position of the controlling laser spot 10 is shifted toward the track C and thus the objective lens 18 is actuated to move the position of the laser spot 10 toward the track D until the tracking error signal $t_e$ is reduced to zero. Thus, where there is the difference in reflectance between the adjacent tracks of the V groove, the position of the controlling laser spot is varied thus making it difficult to effect the tracking control accurately.

SUMMARY OF THE INVENTION

With a view to overcoming the foregoing deficiencies in the prior art, it is an object of the present invention to provide an optical disk reproducing apparatus capable of performing the tracking control accurately even if the reflectances of the two tracks on each V-groove are varied.

To accomplish the above object, in accordance with the invention a variation signal is produced by extracting the low-frequency component of a signal reproduced from each track of a V groove by a reproducing laser spot so that the difference between the variation signals from the two tracks on the V groove is determined and it is added as a correction signal to a tracking error signal. Thus, the tracking control is effected by using the tracking error signal corrected by the correction signal.

The reproduced signal is indicative of a change in the reflectance of the recording medium on the track. As a result, the variation signal comprising the low-frequency component extracted from the reproduced signal indicates a variation in the average reflectance of the track and the correction signal representing the difference between the variation signals from the two tracks is indicative of a change in the difference between the average reflectances of the two tracks. The correction signal is proportional to the difference between the quantities of light incident to two tracking control photosensors. Thus, by correcting the tracking error signal by using the correction signal, it is possible to eliminate the variation of the tracking error signal due to the difference in incident light quantity.

BRIEF DESCRIPTION OF THE DRAWINGS

FIGS. 4(a) and (b) show respectively a schematic diagram showing the positions of the laser spots and a block diagram showing the construction of a conventional tracking control circuit.

DESCRIPTION OF THE PREFERRED EMBODIMENTS

An embodiment of the invention will now be described with reference to the drawings.

Figure 1:
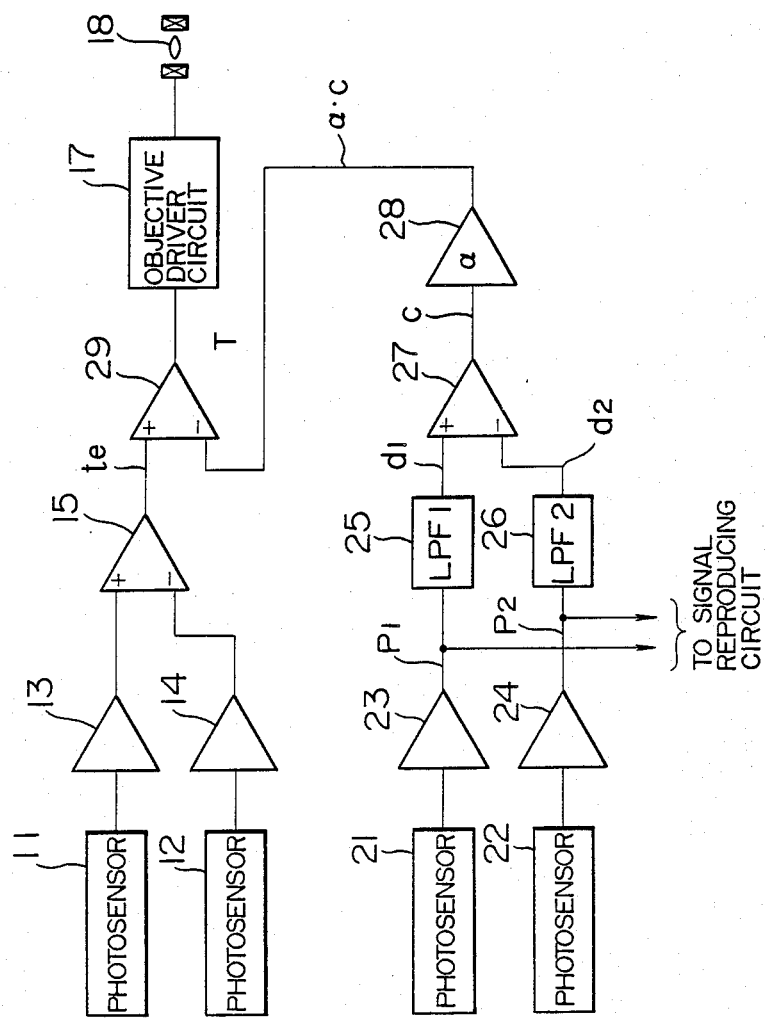
FIG. 1 is a block diagram showing the construction of a tracking control circuit used in an embodiment of the present invention.
Figure 2:
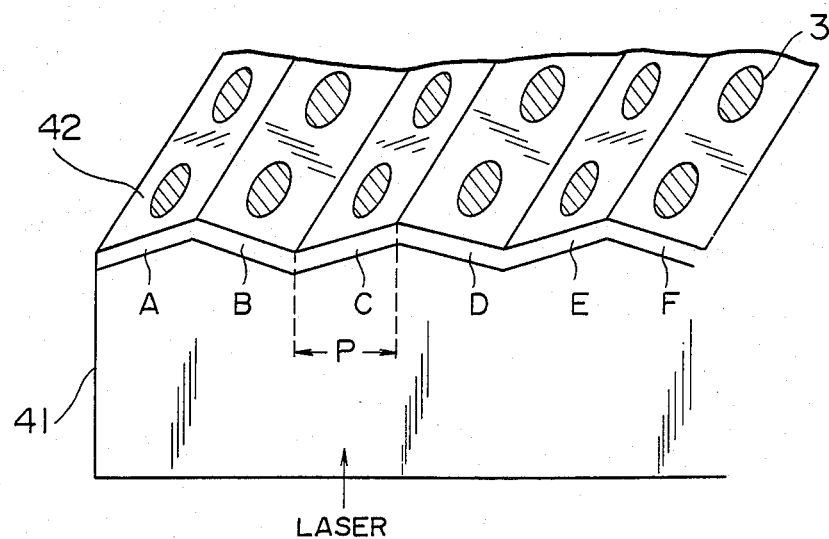
FIG. 2 is a perspective view showing the radial section of an optical disk formed with V grooves.
Figure 3:
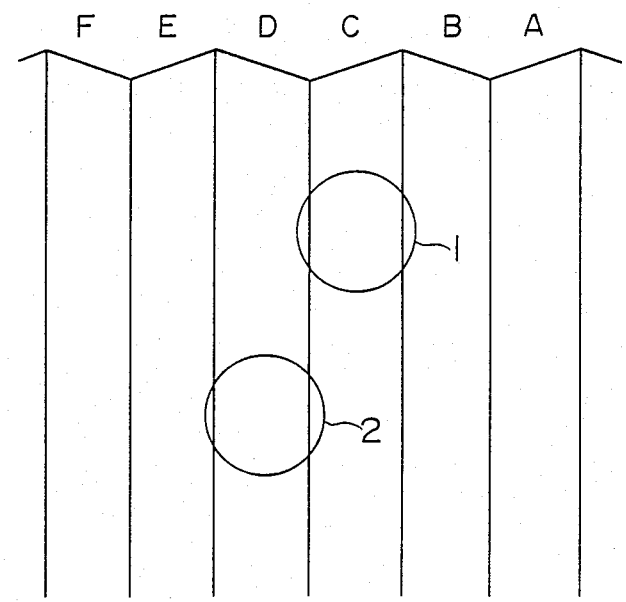
FIG. 3 is a schematic diagram showing the positions of laser spots.

Referring to FIG. 1, there is illustrated a tracking control circuit used in the embodiment. In the Figure, numerals 11 and 12 designate photosensors, 13 and 14 preamplifiers, 15 a subtractor, and 17 an objective driver circuit. These component elements are equivalent to their counterparts described in connection with FIG. 4(b). Numerals 21 and 22 designate signal reproducing photosensors, 23 and 24 preamplifiers, 25 and 26 low-pass filters, 27 a subtractor, 28 a gain adjuster, and 29 a subtractor.

It is assumed that in this embodiment the laser spots are arranged in the same manner as shown in FIG. 4(a). The bisplit photosensors 11 and 12 detect the reflected light beams of a controlling laser spot 10 and the subtractor 15 produces a tracking error signal $t_e$ as shown by the previously mentioned equation(1).

On the other hand, the photosensor 21 detects the reflected light of a reproducing laser spot 1 and the detected light is passed through the preamplifier 23, thereby producing a reproduced signal $P_1$. Similarly, the reflected light of a reproducing laser spot 2 is detected by the photosensor 22 and passed through the preamplifier 24, thereby producing a reproduced signal $P_2$. These reproduced signals $P_1$ and $P_2$ are also delivered to a signal reproducing circuit (not shown) and the reproduced signals are demodulated to digital signals. The low-pass filters 25 and 26 have the same frequency band as the tracking signals so that the low-frequency component is extracted from each of the reproduced signals and variation signals $d_1$ and $d_2$ are produced. The subtractor 27 obtains the difference between the variation signals $d_1$ and $d_2$ and a correction signal C is produced. The correction signal C is given by the following equation.

$$C = d_1 - d_2 \qquad (2)$$

The gain adjuster 28 increases the correction signal C by $\alpha$ times to adjust the gain of the correction signal C and the tracking error signal $t_e$ and its output is applied to the subtractor 29. The subtractor 29 subtracts the amplified correction signal C from the tracking error signal $t_e$ to produce a corrected tracking error signal T. The corrected tracking error signal T is given by the following equation.

$$T = t_e - \alpha \cdot C \qquad (3)$$

The objective driver circuit 17 is responsive to the corrected tracking error signal T to actuate the objective lens 18.

The operation of the embodiment will now be described. Each of the reproduced signals $P_1$ and $P_2$ represents a change in the light quantity of the reflected light from the corresponding track. Thus, each of the variation signals $d_1$ and $d_2$ represents the component of the reflected light quantity change which is included in the track control frequency band and hence the average reflectance variation of the corresponding track. Then, the correction signal C represents the difference between the reflected light quantities obtained from the two tracks, that is, the difference between the average reflectance of the tracks. Thus, where there is the difference in average reflectance between the tracks, there is the difference in light quantity between the incident reflected light beams to the tracking photosensors even if the tracking control is effected accurately. The light quantity changes generated by the tracking photosensors are proportional to the light quantity changes generated by the reproducing photosensors. Therefore, the light quantity difference provided by the tracking photosensors or the variation of the tracking error signal is proportional to the correction signal C. This correction signal C is amplified by $\alpha$ times and the amplified correction signal C is subtracted from the tracking error signal $t_e$. Thus, by optimizing the value of $\alpha$, it is possible to cancel the variation of the tracking error signal $t_e$. The value of $\alpha$ can be preliminarily established in accordance with the efficiencies of the tracking and reproducing photosensors and the amplification factors of the preamplifiers, for example.

Figure 5:
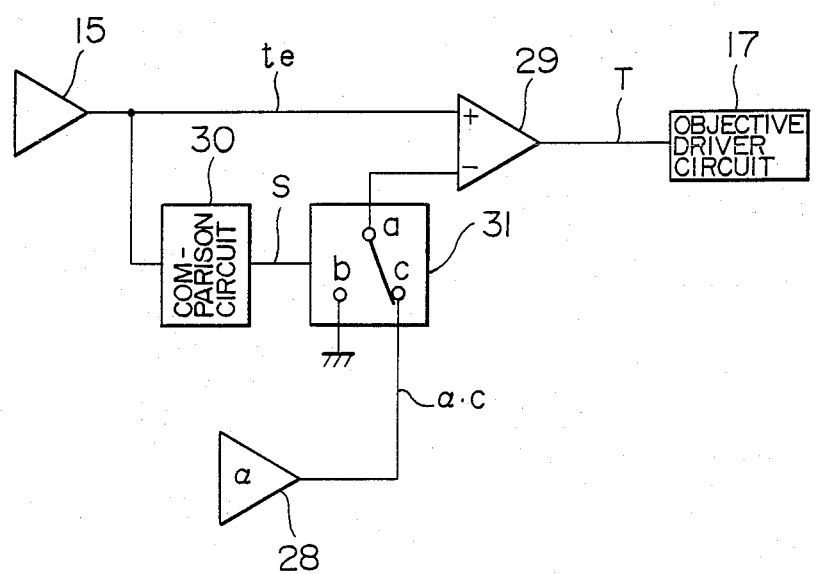
FIG. 5 is a block diagram of a tracking control circuit used in another embodiment of the invention.

Another embodiment of the invention will now be described. FIG. 5 shows a part of a tracking control circuit used in this embodiment. In the Figure, numeral 15 designates a subtractor, 17 an objective driver circuit, 28 a gain adjuster, and 29 a subtractor. These component elements are the same with their counterparts described in connection with FIG. 1. The input section for the subtractor 15 and the input section for the gain adjuster 28 are the same with their counterparts described in connection with FIG. 1 and are not shown.

In this embodiment, the tracking error signal $t_e$ generated from the subtractor 15 is delivered to the subtractor 29 and a comparator 30, respectively. The comparator 30 compares a preset reference value K and the tracking error signal $t_e$ as to relative magnitude and a switching signal S is applied to a change-over circuit 31. When the tracking error signal $t_e$ is greater than the reference value K, the switching signal S connects a contact a to a contact b in the change-over circuit 31 and the input level to the subtractor 29 is reduced to zero. When the tracking error signal $t_e$ is smaller than the reference value K, the switching signal S connects the contact a to a contact c in the change-over circuit 31 and a correction signal $\alpha \cdot C$ is applied to the subtractor 29.

During reproduction of the optical disk, there are for example certain operation modes where the ordinary tracking control is not performed, such as, when the reproduction is effected by jumping the tracks and when the desired track is searched. In such a case, there is the danger of causing noise in the reproduced signals due to the effect of the traversed tracks and the tracking error being not always educed even if the tracking control is corrected according to the invention. Thus, where the tracking error signal has such a large value, the correcting operation must be stopped. The tracking control circuit of this embodiment is adapted for such case. In accordance with this embodiment, the correcting operation is performed only when the value of the tracking error signal $t_e$ is within a predetermined range. More specifically, when the value of the tracking error signal $t_e$ is greater than the preset reference value K, it is considered that the tracking control is not functioning properly and the correction signal is reduced to zero, thereby directly delivering the tracking error signal $t_e$ as a corrected tracking error signal T to the objective driver circuit 17. Then, the tracking control is performed normally so that if the value of the tracking error signal $t_e$ is smaller than the reference value K, the change-over circuit 31 is operated to deliver a correction signal $\alpha \cdot C$ to the subtractor 29.

As described hereinabove, the tracking control by the ordinary push-pull method is performed and then the tracking control is corrected by the use of a correction signal. By thus performing the two-stage tracking control, it is possible to enhance the stability of the tracking control and improve its accuracy. As mentioned, however, since the operation mode of the reproducing apparatus is generally controlled by a system controller, it is possible to provide an additional arrangement for monitoring the operation mode by a mode detecting circuit and stopping the operation of subtracting the correction signal from the tracking error signal in order for the mode of disabling the tracking control.

It is to be noted that in this specification the term average reflectance corresponds to the average value of the reflected light detected by the photosensor and it does not necessarily coincide with the reflectance which is an optical constant of a recording medium. This will be explained with reference for example to an optical disk formed with pits of a depth correspond to $\frac{1}{4}$ of the reproducing laser wavelength. In the case of such optical disk, while the reflectance of the recording medium is constant, the reflected light from the track is diffracted by the pit and the quantity of incident light to the photosensor is decreased. In this case, it is also possible to effect the tracking control correction according to the invention.

In accordance with the invention, the difference in reflected light quantity between the two tracks can be given by extracting the low-frequency component of a reproduced signal from each of the tracks and determining the difference in low-frequency component between the tracks to use it as a correction signal. Then, the tracking error signal is corrected by using the correction signal to reduce the error of the tracking error signal due to the reflected light quantity difference. Thus, the invention has a very great practical utility.

We claim:

1. An apparatus for reproducing information recorded on an optical disk having a plurality of V grooves each of said V grooves being formed by two sloped surfaces, with each of the sloped surfaces forming an information track, said apparatus comprising:
   a tracking control circuit comprising:
      a bisplit photosensor for detecting reflected light from a controlling laser beam projected onto one of said V grooves;
      means for forming a difference of the outputs of said bisplit photosensor to produce a tracking error signal;
   a pair of information reproducing photosensors for respectively receiving reflected reproduction laser light from a pair of tracks of one of said V grooves which is irradiated by a pair of reproducing laser beams, said reproducing laser beams being respectively provided at the center of two slopes forming a V groove when the controlling laser beam is positioned at the center of the same V groove;
   a pair of preamplifiers respectively connected to the outputs of said pair of information reproducing photosensors for producing a pair of track information reproduction signals;

a pair of low pass filters respectively connected to outputs of said preamplifiers for extracting a low frequency component from each of said reproduction signals;

a first subtractor connected to the outputs of said filters for determining a difference in a low-frequency component of the filter outputs and for producing a correction signal;

a second subtractor for subtracting said correction signal from said tracking error signal to form a corrected tracking error signal; and means for controlling the tracking of the reproducing laser beams in accordance with said corrected tracking error signal.

2. An apparatus according to claim 1, further comprising:

means for comparing said tracking error signal with a predetermined reference value and providing a switching signal at an output thereof; and a change-over circuit connected to a correction signal input of said second subtractor and responsive to said switching signal for switching the correction signal input to zero potential when said tracking error signal is greater than said reference value and for connecting the correction signal input to said correction signal when said tracking error signal is smaller than said reference signal;

whereby said subtraction of said correction signal from said tracking error signal is effected only when the magnitude of said tracking error signal is within a predetermined range.

* * * * *